Figure 1:
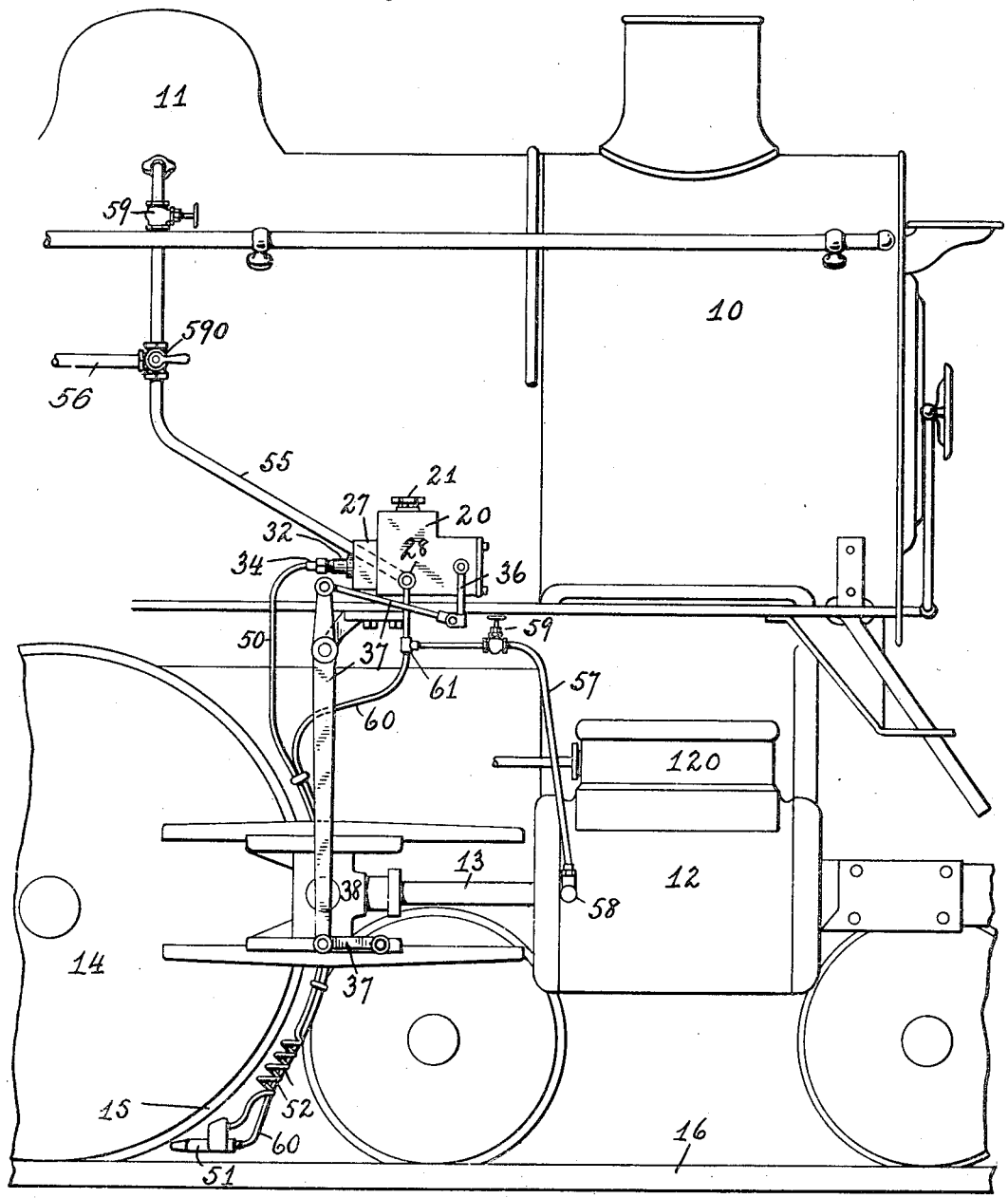

R. WOOD.
FLANGE LUBRICATOR.
APPLICATION FILED JAN. 29, 1914.

1,134,363.   Patented Apr. 6, 1915.
3 SHEETS—SHEET 3.

Attest:   Inventor:
Clarence E. Campbell   Robert Wood,
Stephen S. Newton   by William R. Baird
   his Atty

UNITED STATES PATENT OFFICE.

ROBERT WOOD, OF BROOKLYN, NEW YORK, ASSIGNOR TO THE NATHAN MANUFACTURING COMPANY, OF NEW YORK, N. Y., A CORPORATION OF NEW YORK.

FLANGE-LUBRICATOR.

1,134,363.      Specification of Letters Patent.      Patented Apr. 6, 1915.

Application filed January 29, 1914. Serial No. 815,103.

*To all whom it may concern:*

Be it known that I, ROBERT WOOD, a subject of the King of Great Britain and Ireland, residing at 435 East Fourth street, Flatbush, Brooklyn, in the county of Kings and State of New York, have invented certain new and useful Improvements in Flange-Lubricators, of which the following is a specification.

This invention relates to flange oilers adapted to be employed in the lubrication of the flanges of the wheels of locomotives and similar vehicles. While running, a locomotive necessarily develops lateral movements which cannot be prevented. It is therefore of importance to lubricate the flanges of the wheels while proceeding around curves, thereby eliminating as much friction as possible and reducing the heat generated. It is not economical or desirable to lubricate the rails because it is only when the flange of the wheel grinds against the side of the rail that the objectionable wear takes place.

It is the object of my invention to provide means actuated from a moving part of the locomotive for forcing the oil to the flanges so that while no oil is supplied thereto while the engine is at rest, it is forced to the proper place of application while the engine is running.

It is also another object of my invention to provide means for keeping the oil in a liquid condition so that the pipes are not clogged by congealed grease or ice, and a further purpose is to deliver the oil to the wheel flanges at a place near the point of contact of the flange with the rail so that the oil is not thrown off of the flanges by centrifugal force before it reaches the rail.

There are other objects sought to be accomplished which will appear from the description of the details of the apparatus.

In the drawings there is illustrated a preferred form of apparatus embodying the invention.

Figure 2:
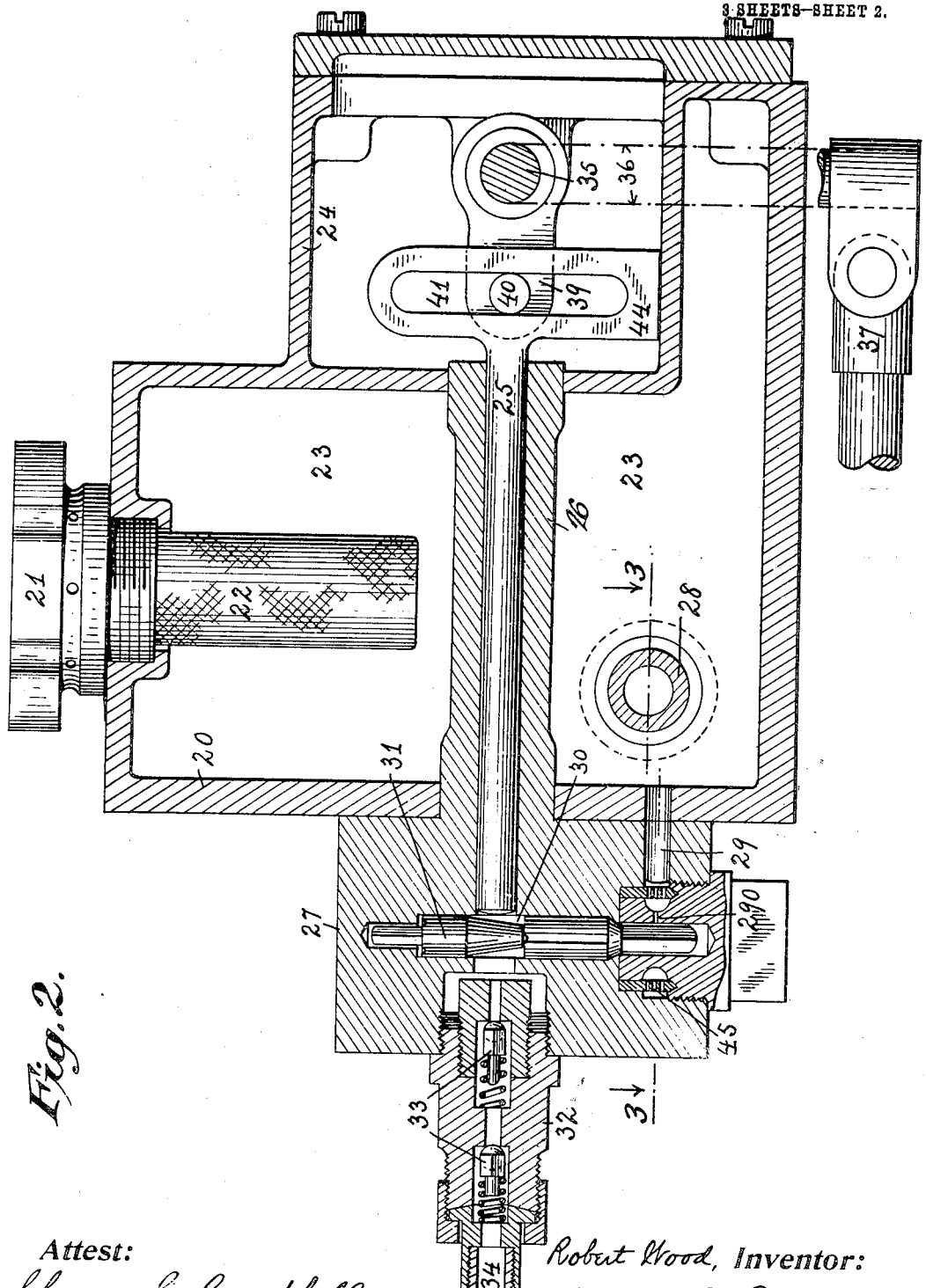
Figure 3:
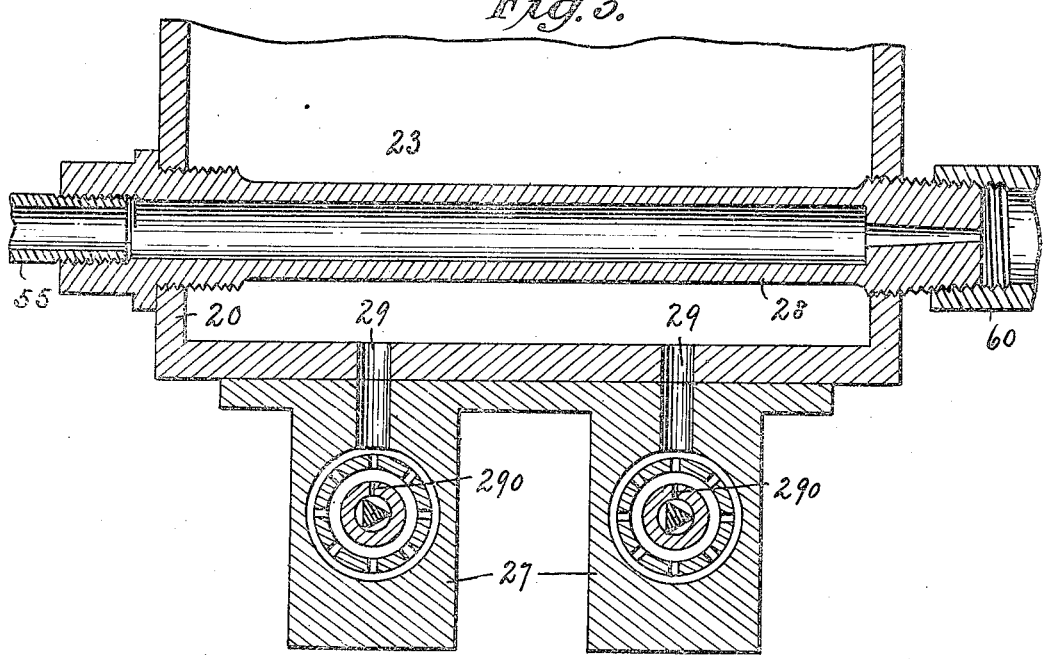
Figure 4:
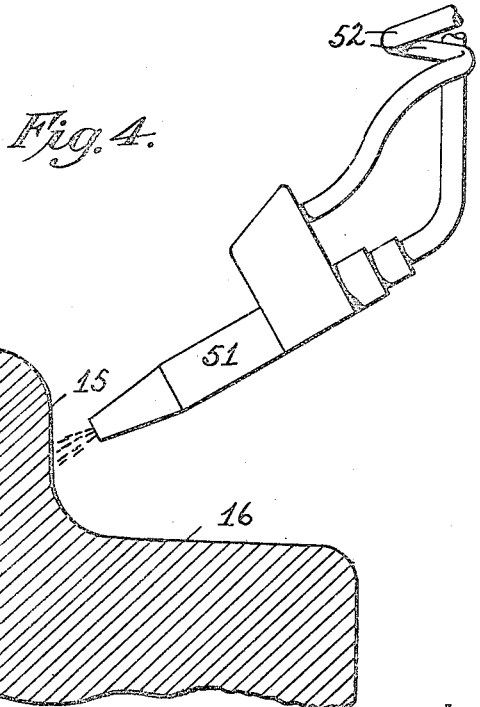

Figure 1 is a side elevation of a part of a locomotive of usual type equipped therewith; Fig. 2 is an enlarged vertical section through the oil reservoir and related parts, some of the parts being shown in elevation back of the section plane; Fig. 3 is an enlarged horizontal section on the plane of the line 3—3 in Fig. 2; Fig. 4 is an enlarged detail of the oil delivery nozzle, an adjacent portion of the wheel and its flange being shown in section.

In the drawings, 10 indicates a part of a locomotive, of which 11 is the steam dome, 12 is one of the cylinders, 120 is the steam chest, 13 is a piston rod, and 14 is one of the driving wheels having the usual flanges 15 and adapted to run on a rail indicated at 16.

Arranged at any convenient place on the locomotive, but preferably near the driving wheels, is an oil reservoir 20 provided at the top with an aperture adapted to receive a filling plug 21 having a depending sieve 22. Adjacent the oil containing chamber 23, and separated therefrom by one of the side walls of the reservoir, is a housing 24 adapted to contain the actuating mechanism for a ram 25 which is adapted to reciprocate in a cylinder 26 arranged longitudinally across the reservoir 20 and which cylinder is expanded to form a casing 27 for the valve system. Arranged transversely across the reservoir 20 is a pipe 28 having no communication with the interior of the reservoir and the purpose of which will presently appear. An outlet port in the reservoir leads to a passageway 29 formed in the casing 27, and this in turn leads through an orifice 290, the size of which determines the amount of oil which can be delivered at each forcing stroke of the ram, to an upright chamber 30. This chamber contains valves 31 and communicates on the one side with the bore of the cylinder 26 and on the other side with the interior of a fitting 32 secured to the casing 27 and which fitting contains check valves indicated at 33 and is connected at its outer extremity to a delivery pipe 34.

Arranged across the housing 24 and adapted to oscillate in suitable bearings provided therein is a shaft 35 moved to and fro by a lever 36 which is in turn moved by a link-and-lever system indicated at 37 from any convenient reciprocating part of the engine, for instance, the cross-head 38. Also secured to the rock shaft 35 is an arm 39 provided with a pin 40 adapted to engage a slot 41 formed in a head 44 forming part of the ram 25.

The shaft 35 being rocked by its connection with the link-and-lever system 37, the pin 40 is oscillated circularly and reciprocates the head 44 and ram 25. As this ram moves to the right as shown in Fig. 2, as it must whenever the pin 40 is moved away from a central position, a vacuum is created in the chamber 30 and the oil from the chamber 23 of the reservoir 20 is thereby drawn into the passageway 29 through a strainer indicated at 45 and the passage 290 above referred to, and causes it to fill the interior of the fitting 32. As the ram moves to the left, as it must whenever the pin 40 is moved to a central position, the head of the ram forces the oil past the check valves 33 and into the delivery pipe 34, it being prevented from returning to the passageway 29 by the valve 31. As the cross-head 38 moves with the piston of the locomotive, it is obvious that the times of the delivery of the oil to the pipe 34 are synchronized with the movements of the piston rod 13 and correspond at all times to the speed of the engine. Also, as the crank arm 39 moves the pin 40 to and from the central position with each stroke of the piston, the feed of the oil takes place twice for each stroke of the piston. In other words, the device provides for a continuous double acting feed at the same rate as the flow of the steam to the cylinders.

A pipe 50 leads from the delivery pipe 34 downwardly toward the lower portion of the wheel 14 and terminates in a nozzle 51 the outlet orifice of which is restricted as compared with the normal cross-sectional area of the pipe. Near the nozzle the pipe 50 is formed into relatively large coils 52 in order to facilitate the adjustment of the nozzle with respect to the wheel flange, it being easy to vary the length of the pipe by bringing the coils closer together or farther apart as the case may be. The pressure of the oil in the coil caused by the friction induced by contact with its curved surfaces, serves to increase the back pressure upon the column of oil initially produced by the restriction of the outlet orifice of the nozzle, and also serves to prevent the oil from becoming saponified.

Suitable means are provided for heating the oil in the reservoir. This is accomplished through the transverse pipe 28, which, in the structure shown in Fig. 1, is connected to a source of steam supply which may be the steam dome through the pipe 55 with or without a branch 56 to the air pump exhaust. From the opposite end of the heater 28 a pipe 60 leads downward alongside of the pipe 50 and terminates in the nozzle 51, so that the steam passing through the pipe 50 forms an atomizing jet which forces the oil out of the nozzle 51 in the form of a fine spray against the flange 15 of the wheel 14. The two pipes 60 and 50 are arranged alongside of each other in close contact so as to effect an interchange of heat which in cold weather will serve to keep the oil in the pipe 50 in a liquid condition. The pipe 60 is also connected by a union indicated at 61 with the pipe 57 which is led from the usual indicator fitting 58. The pipes 57 and 55 are controlled by manually operated valves indicated at 59 and a branch leading from the pipe 55 to the exhaust in the air pump is controlled by a three way cock indicated at 590.

In the use of the device, the reservoir 20 is first filled with oil. The steam is then turned on so that it will pass through the heater pipe 28 into the pipe 60 either from the exhaust of the air pump or the steam dome through the pipe 55 or from the main cylinder through the pipe 57. Assuming now that the engine begins to move, the ram 25 draws the oil from the reservoir 20 as above explained and forces it through the pipe 34 and thence to the pipe 50 against the back pressure created in such pipe as above explained and to the nozzle 51. At the same time, the steam coming down from the pipe 28 into the pipe 60 or from the pipe 57 into the pipe 60 serves to heat the oil in the pipe 50 and then entering the nozzle 51 creates a steam jet which forcibly ejects the oil against the flange 15 of the wheel 14. The connection to the pipe 57 is of course optional. It may be used with the connection from the pipe 55 or without it. The steam from the steam dome or the exhaust of the air pump of course affords a constant supply to the pipe 60 while the steam from the main cylinder to the pipe 57 affords a supply which is intermittent and only available when the engine is running. The device it will be seen therefore is so arranged that while the oil is only fed or forced to the pipe 50 while the engine is running, the steam jet through the pipe 60 may be supplied either through the pipe 57 only while the engine is runnig or through the pipe 55 at all times. The constant source of supply is of course desirable in cases of extremely cold weather, while the intermittent source of supply may be used at other seasons or may be used to supplement the constant source of supply to blow out the nozzle 51 and relieve it of ice or an accumulation of congealed oil.

What I claim is:

1. A flange oiler for a locomotive, comprising an oil reservoir, an oil delivery pipe adapted to receive oil therefrom, a ram adapted to be moved from a moving part of the engine in unison with the reciprocation of the piston to force oil from the reservoir to the supply pipe at a rate corresponding to the flow of the steam, in combination with means for maintaining a pressure greater than atmospheric pressure in the oil delivery pipe consisting in coiling the pipe near its terminal.

2. A flange oiler for a locomotive, comprising an oil reservoir, an oil delivery pipe adapted to receive oil therefrom, a ram adapted to be moved from a moving part of the engine in unison with the reciprocation of the piston to force oil from the reservoir to the supply pipe at a rate corresponding to the flow of the steam, in combination with means for maintaining a pressure greater than atmospheric pressure in the oil delivery pipe consisting in coiling the pipe near its terminal and reducing its cross sectional area.

3. A flange oiler for a locomotive, comprising an oil reservoir, an oil delivery pipe adapted to receive oil therefrom, a ram adapted to be moved from a moving part of the engine in unison with the reciprocation of the piston to force oil from the reservoir to the supply pipe at a rate corresponding to the flow of the steam in combination with means for heating the oil in the reservoir, including a heater pipe passing through the reservoir and connected to a source of steam supply and means for forcibly ejecting the oil toward the wheel flange at the delivery end of the supply pipe, consisting of a pipe leading from the heater pipe to the delivery end of the supply pipe.

4. A flange oiler for a locomotive comprising an oil reservoir, means for forcing the oil therefrom in harmony with the actuation of the engine, a pipe leading from the reservoir to one or more of the wheel flanges, through which the oil is forced, and a heater for the oil adapted to exhaust at the terminus of the pipe leading to the wheel flanges, to assist in forcibly ejecting the oil from such pipe.

5. A flange oiler for locomotives comprising one or more pipes adapted to convey a supply of oil to the wheel flanges, in combination with two optional means for assisting in ejecting the oil from the pipes, one constant and the other intermittent.

6. A flange oiler for locomotives comprising a pipe adapted to convey a supply of oil to a wheel flange in combination with two means for assisting in forcibly ejecting the oil from the pipe against the wheel flange, one such means being constant and the other intermittent and automatic.

7. The combination with a locomotive and the operating elements therefor, of an oil reservoir, means for automatically delivering oil therefrom to the wheel flanges, and a heating means for the oil, both the delivery and heating means controlled by the operating elements of the locomotive.

8. The combination with a locomotive and its operating elements, of an oil reservoir, means for automatically delivering oil therefrom to the wheel flanges, and two optional means for heating the oil, one adapted to be controlled by the operation of the operating elements of the locomotive.

In testimony whereof I affix my signature in presence of two witnesses.

ROBERT WOOD.

Witnesses:
MARY H. LEWIS,
CLARENCE G. CAMPBELL.